United States Patent
Kachmar (10) Patent No.: US 7,811,156 B2
(45) Date of Patent: Oct. 12, 2010

(54) OPTICAL FIBER PREPARATION DEVICE

(75) Inventor: Wayne M. Kachmar, North Bennington, VT (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 194 days.

(21) Appl. No.: 11/693,908

(22) Filed: Mar. 30, 2007

(65) Prior Publication Data

US 2008/0240664 A1    Oct. 2, 2008

(51) Int. Cl.
B24D 15/02    (2006.01)

(52) U.S. Cl. .................................... 451/523

(58) Field of Classification Search ............ 451/41, 451/54, 65, 523
See application file for complete search history.

(56) References Cited

U.S. PATENT DOCUMENTS

| | | | |
|---|---|---|---|
| 3,975,865 A | 8/1976 | Lewis | |
| 4,178,722 A * | 12/1979 | Forman et al. | 451/359 |
| 4,255,164 A | 3/1981 | Butzke et al. | |
| 4,272,926 A | 6/1981 | Tamulevich | |
| 5,193,133 A | 3/1993 | Schofield et al. | |
| 5,325,452 A | 6/1994 | Stein et al. | |
| 5,577,149 A | 11/1996 | Averbeck et al. | |
| 5,626,639 A * | 5/1997 | King | 51/297 |
| 5,778,125 A | 7/1998 | Busse et al. | |
| 5,813,902 A | 9/1998 | Weigand | |
| 5,925,191 A * | 7/1999 | Stein et al. | 451/557 |
| 5,956,793 A * | 9/1999 | Cox | 15/104.002 |
| 6,078,719 A | 6/2000 | Wiegand et al. | |
| 6,099,392 A * | 8/2000 | Wiegand et al. | 451/41 |
| 6,449,795 B1 * | 9/2002 | Sato | 15/210.1 |
| 6,466,310 B2 | 10/2002 | Nguyen et al. | |
| 6,560,811 B1 * | 5/2003 | Krause et al. | 15/210.1 |
| 6,672,772 B2 | 1/2004 | Gimbel et al. | |
| 6,676,763 B2 * | 1/2004 | Johnson et al. | 134/1 |
| 6,685,129 B2 | 2/2004 | Nguyen et al. | |
| 6,733,184 B2 | 5/2004 | Nguyen et al. | |
| 6,758,727 B2 | 7/2004 | Coad | |
| 6,765,658 B2 * | 7/2004 | Nguyen et al. | 356/73.1 |
| 6,790,131 B2 | 9/2004 | Wetenkamp et al. | |
| 6,810,552 B2 * | 11/2004 | Miyake et al. | 15/210.1 |
| 6,978,071 B2 | 12/2005 | Hwang et al. | |
| 7,112,119 B1 | 9/2006 | Swedek et al. | |
| 7,140,950 B1 | 11/2006 | Bylander et al. | |
| 7,192,197 B2 * | 3/2007 | Carberry et al. | 385/75 |

(Continued)

OTHER PUBLICATIONS

International Search Report and Written Opinion mailed Aug. 15, 2008.

*Primary Examiner*—Maurina Rachuba
(74) *Attorney, Agent, or Firm*—Merchant & Gould P.C.

(57) ABSTRACT

An optical fiber preparation device (11) is disclosed having a body (12) with at least one abrasive portion (15) and at least one adhesive portion 19. The abrasive portion (15) includes a protrusion (29) defining a polishing portion (31). A method for polishing and cleaning an end of an optical fiber using the optical fiber preparation device includes the steps of inserting the end of the optical fiber into the abrasive portion of the optical fiber preparation device and rotating the optical fiber preparation device about the center of the abrasive portion. A cover member (23) is removed from the optical fiber preparation device, exposing the adhesive portion, and the end of the optical fiber is then pressed against the adhesive portion.

9 Claims, 5 Drawing Sheets

U.S. PATENT DOCUMENTS

| | | |
|---|---|---|
| 7,217,174 B1 | 5/2007 | Medeiros |
| 2003/0005942 A1* | 1/2003 | Johnson et al. ................ 134/1 |
| 2003/0128939 A1* | 7/2003 | Nguyen et al. ................ 385/85 |
| 2003/0156799 A1* | 8/2003 | Wada et al. ................... 385/85 |
| 2004/0020514 A1* | 2/2004 | Orsillo ......................... 134/6 |
| 2005/0284185 A1* | 12/2005 | Abe et al. ..................... 65/503 |
| 2006/0188208 A1 | 8/2006 | Carberry |

* cited by examiner

FIG. 8

OPTICAL FIBER PREPARATION DEVICE

TECHNICAL FIELD

The present invention relates to field preparation tools, and more particularly, to field preparation tools used to prepare optical fibers for splicing.

BACKGROUND

Fiber optic cables are widely used to transmit light signals for high-speed data transmission. A fiber optic cable typically includes: (1) an optical fiber or optical fibers; (2) a buffer or buffers that surrounds the fiber or fibers; (3) a strength layer that surrounds the buffer or buffers; and (4) an outer jacket. A typical optical fiber includes an inner core surrounded by a cladding that is covered by a coating. Buffers (e.g., loose or tight buffer tubes) typically function to surround and protect coated optical fibers. Strength layers add mechanical strength to fiber optic cables to protect the internal optical fibers against stress applied to the cables during installation and thereafter. Outer jackets provide protection against damage caused by crushing, abrasions, and other physical damage, as well as chemical damage (e.g., ozone, alkali, acids).

Fiber optic networks include a plurality of fiber optic cables. Often times in these fiber optic networks, the fiber optic cables require terminations. One type of termination frequently used is a mechanical splice. As is well known to those skilled in the art, a mechanical splice is a joint created between two optical fibers of a fiber optic network wherein the optical fibers are aligned by a mechanical means.

It is an important requirement in fiber optic networks that the amount of optical power lost through the network is minimized. As mechanical splices are often included in a fiber optic network, the optical power lost through these splices must also be minimized in order to have an optimal system. One of the primary reasons for optical power losses in mechanical splices is the inclusion of a "fiber lip" on one of the end faces of the optical fibers being coupled. As will be described in more detail subsequently, a fiber lip is located on the outer circumference of the end face of an optical fiber and is often the result of a poor cleave. If a fiber lip is present on an end face of an optical fiber, poor alignment between that end face and an end face of another optical fiber will result. This poor alignment will in turn result in increased optical power losses through that splice.

Another reason for optical power losses in mechanical splices is due to contamination on the end faces of the optical fibers. If the end faces of the optical fibers have contaminants, including but not limited to dirt, dust, or glass particles or fibers, these contaminants will absorb some of the light being transmitted through the optical fiber and/or potentially scratch the end face of the fiber.

SUMMARY

An aspect of the disclosure relates to an optical fiber preparation device having a body with at least one abrasive portion and at least one adhesive portion. The abrasive portion includes a protrusion that defines a polishing portion.

Another aspect of the disclosure relates to a method for polishing and cleaning an end of an optical fiber using the optical fiber preparation device and includes the steps of inserting the end of the optical fiber into the abrasive portion of the optical fiber preparation device and rotating the optical fiber preparation device about the center of the abrasive portion. A cover member is removed from the optical fiber preparation device, exposing the adhesive portion, and the end of the optical fiber is then pressed against the adhesive portion.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings are included to provide a further understanding of the present invention and are incorporated in and constitute a part of this specification. The drawings illustrate exemplary embodiments of the present invention and together with the description serve to further explain the principles of the invention. Other aspects of the present invention and many of the attendant advantages of the present invention will be readily appreciated as the present invention becomes better understood by reference to the following Detailed Description when considered in connection with the accompanying drawings, and wherein.

DETAILED DESCRIPTION

With reference now to the various figures in which identical elements are numbered identically throughout, a description of various exemplary aspects of the present invention will now be provided.

Figure 1:
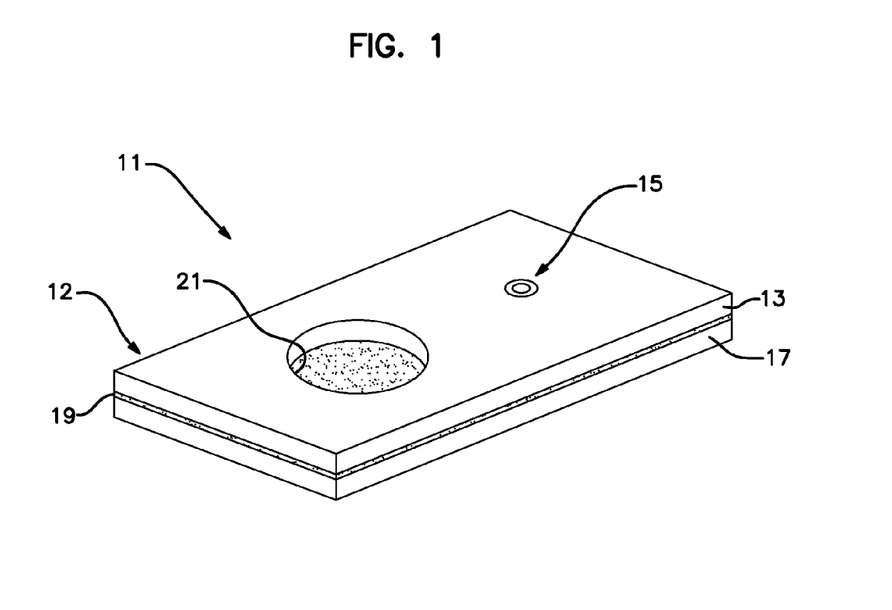
FIG. 1 is a perspective view of an optical fiber preparation device made in accordance with the present invention.
Figure 1A:
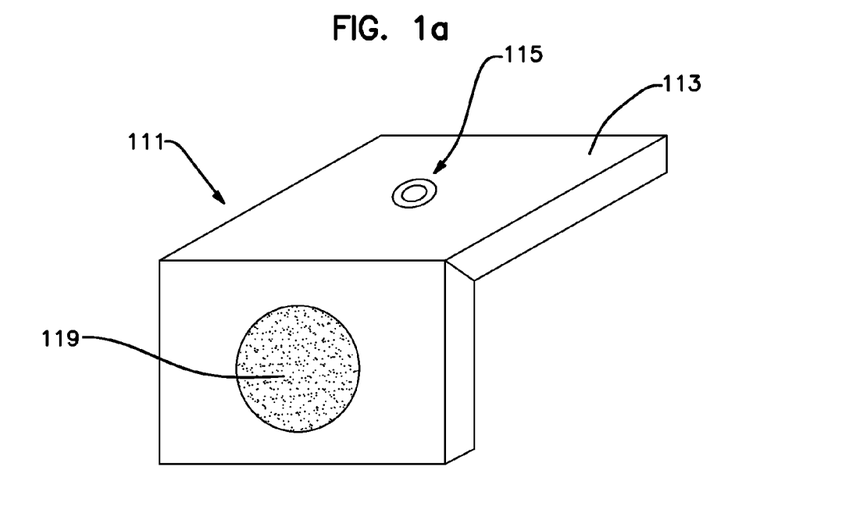
FIG. 1a is an alternate embodiment of an optical fiber preparation device made in accordance with the present invention.
Figure 1B:
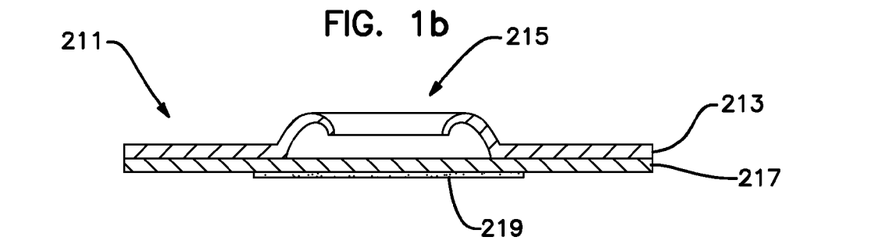
FIG. 1b is a cross-sectional view of an alternate embodiment of an optical fiber preparation device made in accordance with the present invention.

Referring now to FIG. 1, an optical fiber preparation device 11 is shown. The optical fiber preparation device 11 includes a body 12 having a first substrate 13 with at least one abrasive portion 15 and a second substrate 17 with at least one adhesive portion 19. While the figures and the specification will only describe one abrasive portion 15 and one adhesive portion 19, it is within the scope of the present invention for there to be multiple abrasive portions 15 and multiple adhesive portions 19 on the optical fiber preparation device 11. In the subject embodiment, the first substrate 13, which is mounted onto the second substrate 17, includes at least one thru hole 21 that exposes the adhesive portion 19 of the second substrate 17. While the adhesive portion 19 and the abrasive portion 15 are both shown as being accessible through a planar surface (e.g. the first substrate 13), the scope of the present invention is not limited to the abrasive portion 15 and the adhesive portion 19 being accessible through a planar surface. FIG. 1a provides an alternate embodiment of an optical fiber preparation device 111 in which an abrasive portion 115 and an adhesive portion 119 are disposed on nonplanar surfaces. FIG. 1b provides an alternate embodiment of an optical fiber preparation device 211 in which an abrasive portion 215 is disposed opposite an adhesive portion 219.

While the optical fiber preparation device 11 will be described as having the first substrate 13 with at least one abrasive portion 15 and the second substrate 17 with at least one adhesive portion 19, it will be understood by those skilled in the art after reviewing the disclosure of the present invention that the scope of the present invention is not limited to the first substrate 13 having the abrasive portion 15 and the second substrate 17 having the adhesive portion 19. In an alternate embodiment, and by way of example only, the first substrate 13 having the abrasive portion 15 could also include the adhesive portion 19, as shown in FIG. 1a, wherein the adhesive portion 19 could be a surface treatment or coating applied to the first substrate 13.

Figure 2:
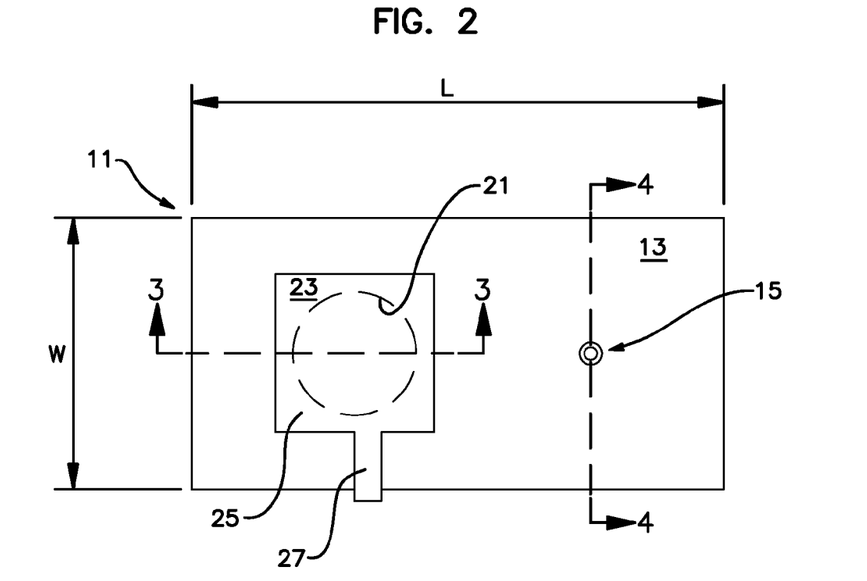
FIG. 2 is a top view of the optical fiber preparation device of FIG. 1.
Figure 3:
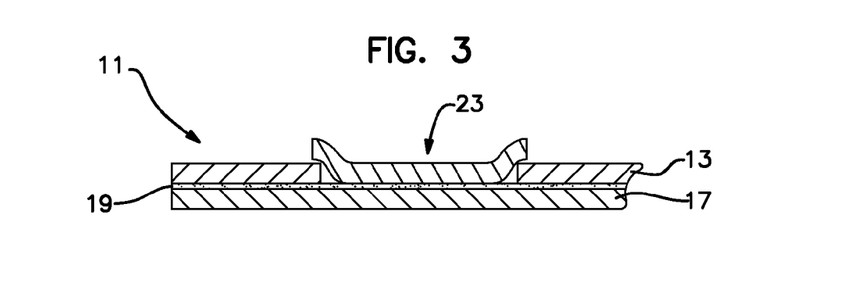
FIG. 3 is a fragmentary cross-sectional view of the optical fiber preparation device taken at line 3-3 in FIG. 2.

Referring now to FIG. 2, a top view of the optical fiber preparation device 11 is shown. Included in this view is a cover member 23, which is used to protect the adhesive portion 19 of the second substrate 17. In a preferred embodiment, the cover member 23 includes a first portion 25 and a second portion 27. The first portion 25 is of an area large enough to cover the thru hole 21 in the first substrate 13. The first portion 25 of the cover member 23 can be affixed to the adhesive portion 19 of the second substrate 17 as shown in FIG. 3. In this embodiment, the surfaces of the cover member 23 would be conventional "easy peel" surfaces or coated with a conventional "easy peel" coating.

Figure 3A:
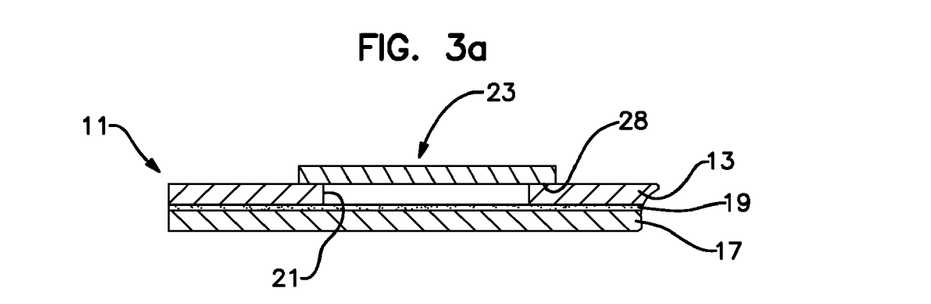
FIG. 3a is a fragmentary cross-section view of an alternate embodiment of an optical fiber preparation device made in accordance with the present invention similar to FIG. 3.

Referring now to FIG. 3a, an alternate embodiment of the cover member 23 is shown. In this alternate embodiment, the cover member 23 is affixed to the first substrate 13 of the optical fiber preparation device 11 with an adhesive. The adhesive is applied to an outer perimeter portion 28 of the cover member 23 that is in contact with the first substrate 13.

Referring again primarily to FIG. 2, in a preferred embodiment, the second portion 27 of the cover member 23 extends beyond the perimeter of the first substrate 13 to allow for easy removal of the cover member 23. This slight extension of the second portion 27 of the cover member 23 allows a user to easily grasp the second portion 27 and pull the second portion 27 toward the opposite side of the cover member 23, thereby exposing the adhesive portion 19 of the second substrate 17. It will be understood by those skilled in the art after reviewing the present disclosure, however, that the scope of the present invention is not limited to the cover member 23 having a first and second portion 25, 27. It is conceivable that the cover member 23 may only include a first portion 25 that covers the adhesive portion 19 of the optical fiber preparation device 11.

Figure 4:
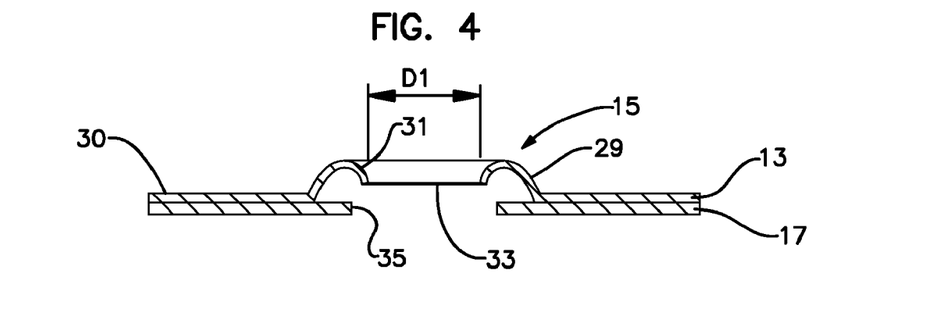
FIG. 4 is a cross-sectional view of the optical fiber preparation device taken at line 4-4 in FIG. 2.
Figure 4A:
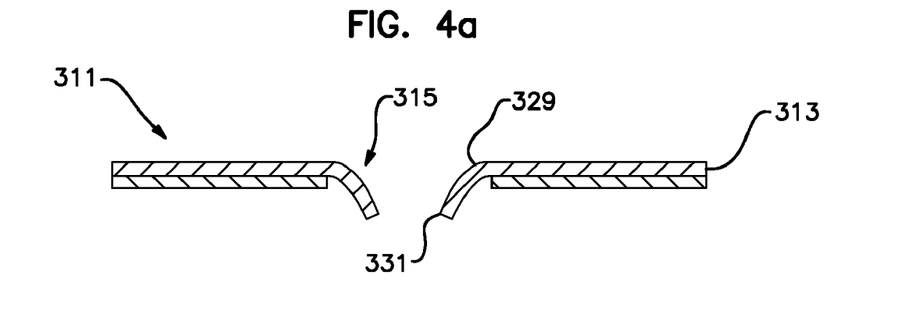
FIG. 4a is a cross-sectional view of an alternate embodiment of an optical fiber preparation device made in accordance with the present invention similar to FIG. 4.

Referring now to FIG. 4, a cross sectional view of the abrasive portion 15 of the optical fiber preparation device 11 is shown. The abrasive portion 15 includes an annular protrusion 29 that projects away from a planar top surface 30 of the first substrate 13. While the annular protrusion 29 is shown in FIG. 4 as projecting upwardly from the planar top surface 30 of the first substrate 13, it will be understood by those skilled in the art that the scope of the present invention is not limited to the annular protrusion 29 projecting upwardly. For example, FIG. 4a shows an alternate embodiment of an optical fiber preparation device 311 in which an annular protrusion 329, which includes a polishing portion 331, extends downwardly from a first substrate 313.

Referring again to FIG. 4, the annular protrusion 29 has a polishing portion 31. The polishing portion 31 has a tapered shape (e.g. conical) with an inner diameter D1 that narrows as it extends downwardly. In a preferred embodiment, the annular protrusion 29 and the polishing portion 31 are sized so that only the outer diameter of the optical fiber is contacted. In other words, in a preferred embodiment, the core of the optical fiber is not contacted by the polishing portion 31. In the subject embodiment, and by way of example only, the inner diameter D1 of the polishing portion 31 is between 20 to 120 μm, while the outer diameter of the optical fiber is between 123 to 131 μm.

As shown in FIG. 4, the polishing portion 31 of the annular protrusion 29 has a toroidal or rounded shape or configuration. However, it will be understood by those skilled in the art after reviewing the present disclosure that the scope of the present invention is not limited to the polishing portion 31 having a rounded shape since the polishing portion 31 could have various shapes and configurations, including but not limited to a chamfer configuration.

The annular protrusion 29 defines an orifice 33 that allows particles generated during polishing to pass through the first substrate 13. In a preferred embodiment, the orifice 33 is located at or about the center of the polishing portion 31. In the subject embodiment, the second substrate 17 has an opening 35 at a location that corresponds with the location of the orifice 33.

Figure 4B:
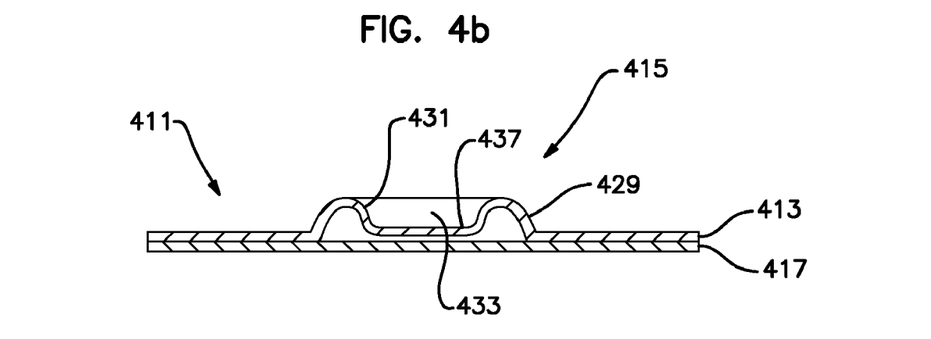
FIG. 4b is a cross-sectional view of an alternate embodiment of an optical fiber preparation device made in accordance with the present invention similar to FIG. 4.

Referring now to FIG. 4b, an alternate embodiment of an abrasive portion 415 of an optical fiber preparation device 411 is provided. In this embodiment, an annular protrusion 429 extends from a first substrate 413. The annular protrusion 429 includes a polishing portion 431 and defines an inner well 433 having a base wall 437. The base wall 437 is recessed from the annular protrusion 429. In this alternate embodiment, the inner well 433 serves as a receptacle for particles generated during polishing. As a result of the inner well 433 having the base wall 437, an opening in a second substrate 417, similar to the opening 35 shown in the embodiment of FIG. 4, is not provided.

Figure 4C:
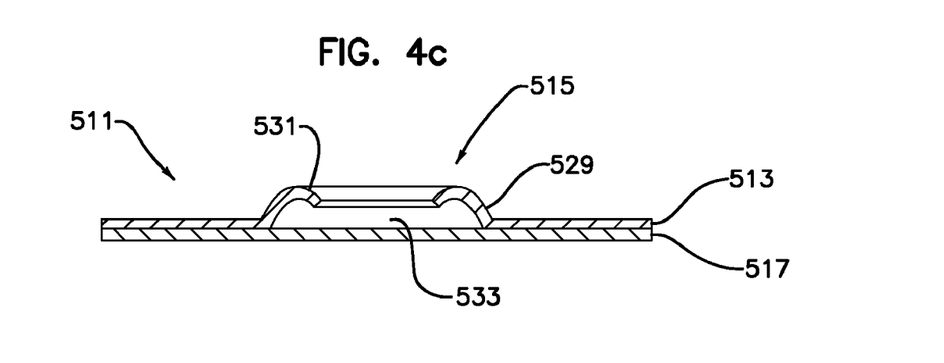
FIG. 4c is a cross-sectional view of an alternate embodiment of an optical fiber preparation device made in accordance with the present invention similar to FIG. 4.

Another alternate embodiment of an abrasive portion 515 of an optical fiber preparation device 511 is provided in FIG. 4c. In this embodiment, an annular protrusion 529 extends from a first substrate 513. The annular protrusion 529 includes a polishing portion 531 having an orifice 533. In this embodiment, the orifice 533 is located at or about the center of the polishing portion 531. A second substrate 517, however, is continuous underneath the orifice 533. In other words, the second substrate 517 does not include an opening similar to the opening 35 shown in the embodiment of FIG. 4. Therefore, the second substrate 517 acts as a receptacle for the particles generated during the polishing that fall through the orifice 533 of the first substrate 513.

A brief description of a method for making the optical fiber preparation device 11 will now be provided. In a preferred embodiment, and by way of example only, the abrasive portion 15 is made from carbide paper having a grit size between 1 to 15 μm and a thickness between 0.03 to 1.0 mm. While a grit size of 1 to 15 μm would be acceptable for most optical fibers, it may be preferred to have a narrower range for the grit size. For example, it might be preferred to have a grit size between 3 to 5 μm. However, while ranges of grit size and thickness have been specified above, it will be understood by those skilled in the art after reviewing the present disclosure that the scope of the present invention is not limited to those grit size and thickness ranges. The annular protrusion 29 of the abrasive portion 15 can be formed in the carbide paper using either conventional stamping, pressing, or thermoforming techniques.

In a preferred embodiment, the second substrate 17 is a medium tack tape or adhesive, although it will be understood by those skilled in the art that the second substrate 17 could also be an alternate material with an applied adhesive. By way of example only, the thickness of the second substrate 17 is between 0.01 to 0.50 mm. The second substrate 17 is affixed to the underside of the first substrate 13 such that the second substrate 17 is disposed beneath the entire underside of the first substrate 13. It will be understood by those skilled in the art, however, that the scope of the present invention is not limited to the second substrate 17 extending the full length of the first substrate 13. As the combined thicknesses of the first substrate 13 and the second substrate 17 are between 0.04 to 1.5 mm, by way of example only, the body 12 of the optical fiber preparation device 11 is flexible.

In addition, in a preferred embodiment, and by way of example only, the optical fiber preparation device 11 has a width dimension W (shown in FIG. 2) of 10 mm and a length dimension L of 30 mm. Therefore, the optical fiber preparation device 11 has the additional advantage of being compact. As a result of the compactness and flexibility of the optical fiber preparation device 11, multiple optical fiber preparation devices 11 can be easily carried by a field technician.

Figure 5:
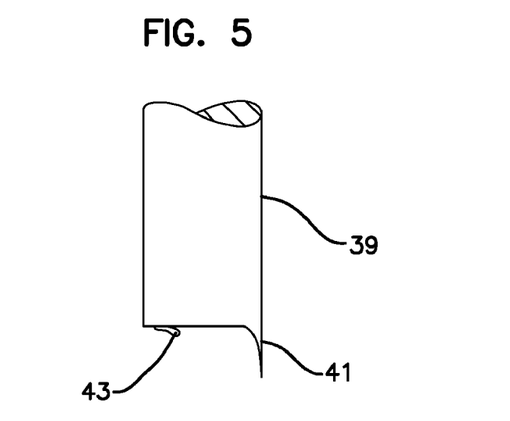
FIG. 5 is a side view of an optical fiber having a fiber lip.
Figure 6:
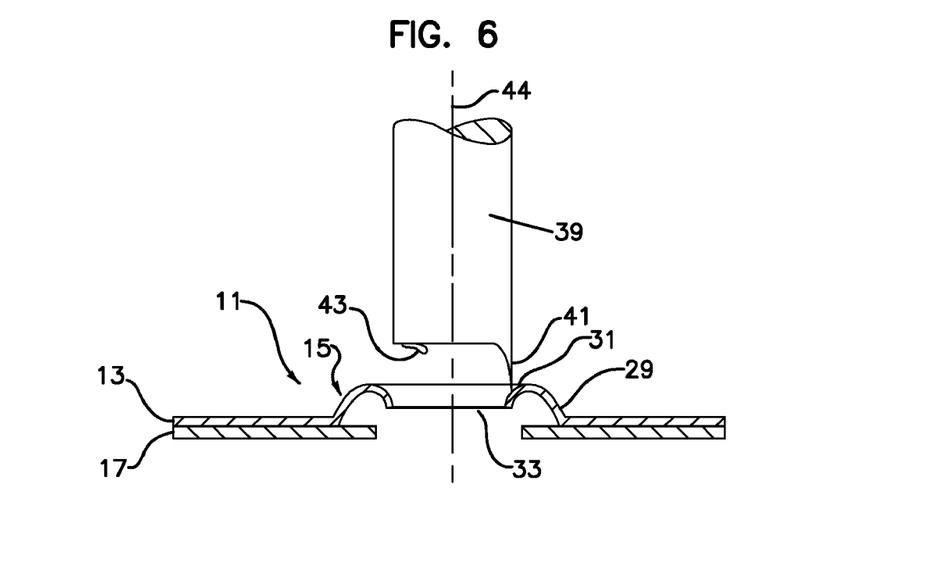
FIG. 6 is a cross-sectional view of an abrasive portion of the optical fiber preparation device of FIG. 1 and a side view of an optical fiber having a fiber lip.
Figure 7:
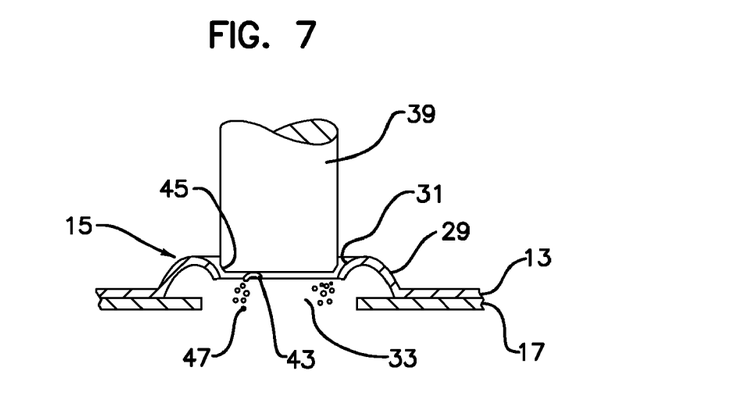
FIG. 7 is a cross-sectional view of an abrasive portion of the optical fiber preparation device of FIG. 1 and a side view of an optical fiber shown after removal of a fiber lip.

Referring now to FIGS. 5-8, the use of the optical fiber preparation device 11 will be described. FIG. 5 illustrates an optical fiber 39 having a fiber lip 41 and contamination 43. As stated in the "Background of the Invention", fiber lips 41 are typically the result of poor cleaves, while contamination 43 is typically caused by dust, dirt or glass fiber particles. If the fiber lip 41 and the contamination 43 are not removed from the end of the optical fiber 39, unacceptable optical power losses may result. FIG. 6 illustrates the optical fiber 39 with the fiber lip 41 entering the abrasive portion 15 of the optical fiber preparation device 11. As the optical fiber 39 enters the abrasive portion 15, the optical fiber preparation device 11 is rotated about a center 44 of the abrasive portion 15 in a clockwise and counterclockwise direction by the user of the optical fiber preparation device 11. During this rotation, the polishing portion 31 of the annular protrusion 29 removes the fiber lip 41 from the optical fiber 39. The optical fiber preparation device 11 is rotated until the fiber lip 41 of the optical fiber 39 is no longer present and there is a slight chamfer 45 on the outer diameter of the optical fiber 39 as shown in FIG. 7. Glass particles 47, which are generated from the interface between the optical fiber 39 and the polishing portion 31 of the abrasive portion 15, fall through the orifice 33 of the annular protrusion 29.

Figure 8:
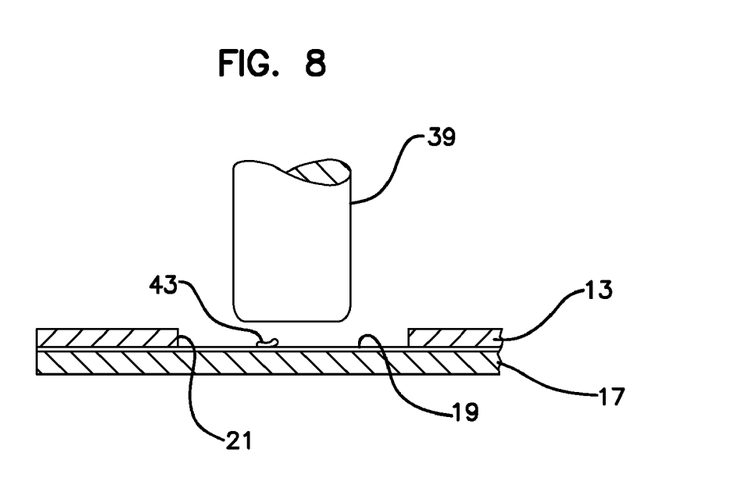
FIG. 8 is a cross-sectional view of an adhesive portion of the optical fiber preparation device of FIG. 1 having a contaminant adhered to the adhesive portion and a side view of an optical fiber.

After the fiber lip 41 is removed and the slight chamfer 45 is formed by the abrasive portion 15 of the optical fiber preparation device 11, the optical fiber 39 needs to be cleaned. The optical fiber 39 is then removed from the abrasive portion 15 of the optical fiber preparation device 11. The cover member 23 is removed from the optical fiber preparation device 11 thereby uncovering the adhesive portion 19. The optical fiber 39 is then gently pressed against the adhesive portion 19. When the optical fiber 39 is removed from the adhesive portion 19, the contamination 43, which was attached to the end face of the optical fiber 39 becomes dislodged from the optical fiber and affixed to the adhesive portion 19 as shown in FIG. 8. Depending on the amount of contamination 43 on the end of the optical fiber 39, it may be necessary to repeat this step.

One particular advantage of the present invention is that it can be inexpensively manufactured. As a result of the inexpensive manufacture, this optical fiber preparation device 11 can be disposable. Having a disposable tool is advantageous because it allows each optical fiber to be polished with a new polishing portion 31 and cleaned with a new adhesive portion 19. If polishing portions are reused, the polished ends of optical fibers may become inconsistent. In addition, if the adhesive portions are reused, contamination removal from the ends of the optical fibers may also become inconsistent. Therefore, by always using a new polishing portion 31 and adhesive portion 19 with each optical fiber 39, any inconsistency between polished and cleaned ends of optical fibers 39 is reduced.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. An optical fiber preparation device comprising:
   a body having:
   a first substrate including at least one abrasive portion, the abrasive portion including a polishing portion that is sized to contact only an outer diameter portion of an end of an optical fiber;
   a second substrate including at least one adhesive portion; and
   wherein the first substrate is mounted onto the second substrate, the first substrate including at least one opening which exposes at least a portion of the adhesive portion of the second substrate.

2. The optical fiber preparation device as claimed in claim 1, further comprising at least one removable cover member, wherein the removable cover member conceals the adhesive portion.

3. The optical fiber preparation device as claimed in claim 2, wherein the cover member includes a portion that extends beyond the perimeter of the body.

4. The optical fiber preparation device as claimed in claim 1, wherein the abrasive portion has a surface roughness between 1 to 15 μm.

5. The optical fiber preparation device as claimed in claim 1, wherein the abrasive portion has a surface roughness between 3 to 5 μm.

6. An optical fiber preparation device comprising:
   a body having:
   a first substrate including at least one abrasive portion having a protrusion with a polishing portion, the polishing portion being sized to contact only an outer diameter portion of an end of an optical fiber;
   a second substrate including at least one adhesive portion; and
   wherein the first substrate is mounted onto the second substrate, the first substrate including at least one opening which exposes at least a portion of the adhesive portion of the second substrate.

7. The optical fiber preparation device as claimed in claim 6, further comprising at least one removable cover member, wherein the removable cover member conceals the adhesive portion.

8. The optical fiber preparation device as claimed in claim 6, further comprising an orifice defined by the protrusion of the abrasive portion.

9. The optical fiber preparation device as claimed in claim 6, wherein the inner diameter of the polishing portion narrows as the polishing portion extends downwardly.

* * * * *